April 9, 1968    R. S. ROOT    3,376,964
SELF-ADJUSTING CLUTCH
Filed July 26, 1966
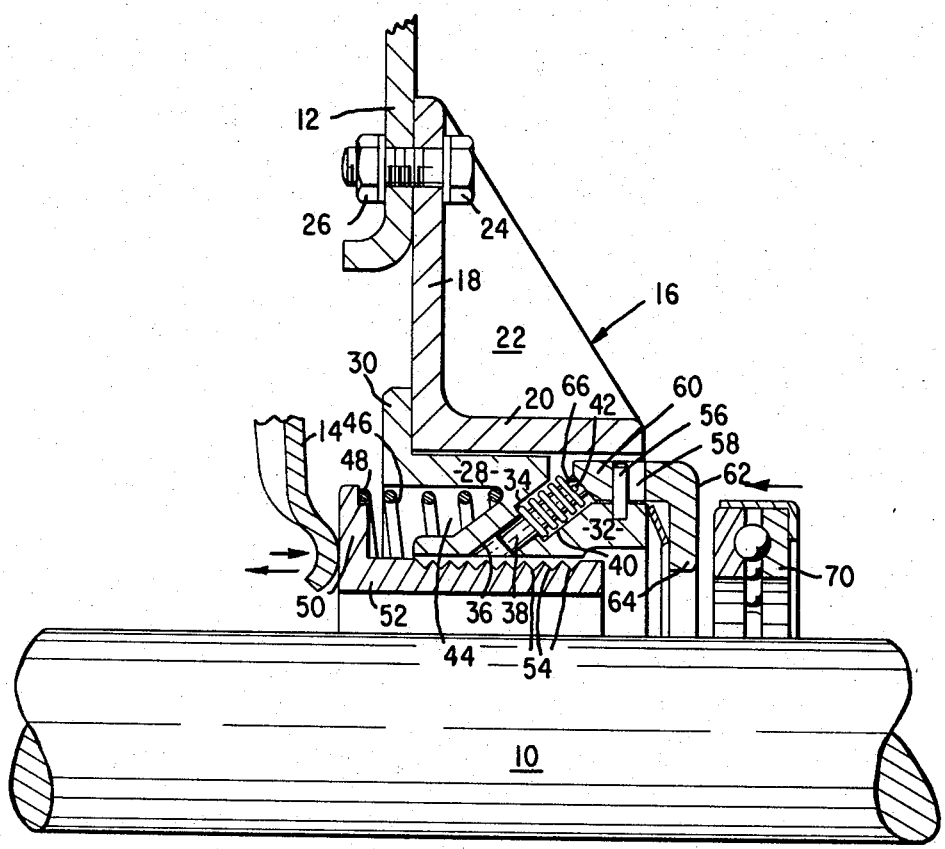
INVENTOR.
ROBERT S. ROOT
BY John R. Varney
ATTORNEY.

3,376,964
SELF-ADJUSTING CLUTCH
Robert S. Root, Syracuse, N.Y., assignor to Lipe-Rollway Corporation, Syracuse, N.Y., a corporation of New York
Filed July 26, 1966, Ser. No. 568,027
1 Claim. (Cl. 192—111)

This invention relates to and has as an object a new and improved self-adjusting clutch mechanism.

In friction disc clutches, the friction facing material wears due to the engagement and disengagement of the clutch. Unless means are provided to adjust the release operating mechanism, to provide for such wear, the pedal linkage or other mechanism used to operate the release mechanism must increase its operating travel distance to compensate for such wear. This increase of the release mechanism operating travel distance has many disadvantages.

Accordingly, it is a more specific object of this invention to provide a self-adjusting clutch release mechanism which is economical to manufacture yet at the same time simple and reliable in operation and maintains a constant release travel distance.

In the drawing is shown a fragmentary cross-sectional elevation of a preferred embodiment of the invention.

This invention consists in the novel features and in the combinations and constructions hereinafter set forth and claimed.

In describing this invention, reference is had to the accompanying drawings in which like characters designate corresponding parts in all the views.

The preferred embodiment of the invention shown in the drawing operates in conjunction with a friction disc clutch of either a single or multiple disc variety and includes a driver (not shown) and a driven member, which in this case is fragmentarily shown as an output shaft 10. The clutch includes a cover member, a portion of which is fragmentarily shown at 12, and a plurality of release levers which extend radially inwardly toward the shaft 10, a portion of one of the levers being shown at 14.

Movement of the release lever 14 to the left as shown in the drawing serves to disengage the driving connection between the driver and the driven shaft 10, and means are provided to normally maintain the driving engagement between the driver and the driven shaft 10, all in the manner well known in the art of friction clutches.

The self-adjusting release mechanism which comprises the subject of this invention includes an annular hub member 16 comprising a wall portion 18 extending outwardly toward the cover 12 and a portion 20 extending generally parallel to the shaft 10, the portions 18 and 20 being formed of one piece and having a triangular rib 22 formed therebetween to give the member adequate rigidity. The member 16 is carried by the cover 12 by means of the bolt 24 which extends through the portion 18 and through an aperture formed in the cover 12 and the nut 26.

The portion 20 of the member 16 is cylindrical and a first annular sleeve member 28 is telescopically received therein. The sleeve member 28 is formed with a radial flange 30 which extends outwardly and engages the forward face of the wall portion 18 of the member 16. The sleeve member 28 has a portion 32 of a reduced radius and a plurality of angularly disposed pockets 34 are formed in the member 28 for a purpose to be hereinafter described. The pockets 34 are formed with a through aperture 36 in which is received a reciprocating pin 38. A shoulder is formed between the pocket 34 and the aperture 36 upon which is received one end of a compression spring 40, the opposite end of the spring being received under a cross pin 42 carried by the outer end of the pin 38, whereby the pin 38 is normally urged outwardly in the slot 36 by means of the spring 40. The forward end of the sleeve member 28 is formed with an annular recess or pocket 44 to receive one end of a compression spring 46, the opposite end of the spring being received in a groove 48 formed on the outer end of the flange 50 on a second sleeve member 52. As seen in the drawing, the sleeve 52 extends inwardly and is telescopically received in the sleeve member 28. The outer surface of the sleeve member 52 is formed with a plurality of circumferential V-grooves 54 for a purpose to be hereinafter described.

The outer end of the sleeve member 28 in the reduced radial portion 32 carries one or more outwardly extending pins 56. The pins 56 are received in slots 58 formed in the wall portion 60 of a cup shaped member 62. The cup shaped member is received in the space between the wall portion 20 of the hub member 16 and the portion 32 of the sleeve 28 for reciprocating movement in said space.

A Belleville washer is received between the outer end of the portion 32 of sleeve 28 and the inner face of the radially inwardly extending portion 64 of the cup member 62 to normally urge the member 62 outwardly. Pin 56 and slot 58 serve to guide and limit movement of the member 62 on the wall portion 32 of sleeve 28. The inner end portion of the wall 60 or member 62 is beveled as at 66 and engages the outer end of pin 38. The clutch is provided with a release bearing 70 carried by any suitable release bearing carrier (not shown) for movement toward and away from the clutch release lever 14 upon operation of the clutch pedal release mechanism. In operation, upon movement of the bearing 70 to the left, the space between the bearing 70 and the radially inwardly extending portion of 64 of member 62 is closed and the bearing 70 engages the cup shaped member and moves it to the left. The amount of movement is determined by the length of the slot 58 and movement of the member 62 urges the pin 38 inwardly against the opposition of the compression spring 40. The pin 38 engages a V-groove in the member 52 and urges it to the left to move the release lever 14 sufficiently to provide disengagement of the driving connection. As wear takes place in the clutch the lever 14 moves to the right as viewed in the drawing. This movement will move the sleeve member 52 against the opposition of the spring 46, which serves to maintain the engagement between the lever 14 and the member 32 to position a new notch 54 for engagement by the pin 38. Accordingly, wear in the clutch member is automatically compensated for so that a constant gap is provided between the release bearing 70 and the member 62. It will be seen that the clearance between the member 62 and the portion 32 of sleeve 38 provided by the Belleville washer is equal to the clearance of the inner end of the pin 38 and the aligned V-groove 54.

What I claim is:

1. A self-adjusting clutch release mechanism to automatically compensate for wear in a lever release friction type clutch, comprising a first sleeve member carried by the clutch cover, a second sleeve member telescopically and slidingly received in said first member, spring means received in the space between said first and second sleeve members to urge apart and to urge said second sleeve member into engagement with the clutch release levers, a cup shaped release member carried by the said first sleeve and a plurality of angularly disposed release pins carried by said first sleeve member and positioned to be moved radially inwardly by said cup shaped member, spring means to normally urge said pins outwardly in said sleeve member and into engagement with the inner end of said cup shaped member, a plurality of V-shaped grooves formed in the outer surface of said second sleeve member and positioned for engagement by said pins, release bearing means operable to move said cup shaped member and said pins inwardly to engage said second sleeve member and move it in the same direction toward said clutch to operate said release members.

References Cited

UNITED STATES PATENTS 2,002,841   5/1936   Tatter.

BENJAMIN W. WYCHE III, *Primary Examiner.*